July 5, 1966            C. E. PITTMAN            3,259,289
TRADING STAMP DISPENSING MACHINE
Filed Oct. 7, 1963            2 Sheets-Sheet 1
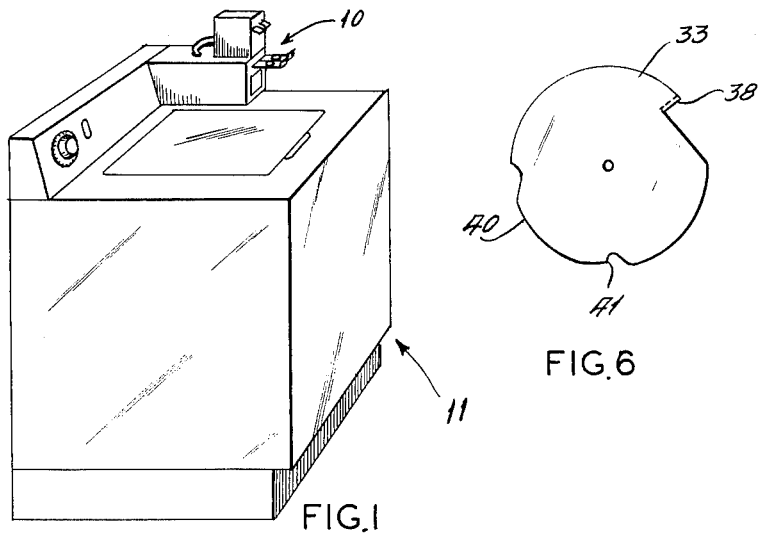
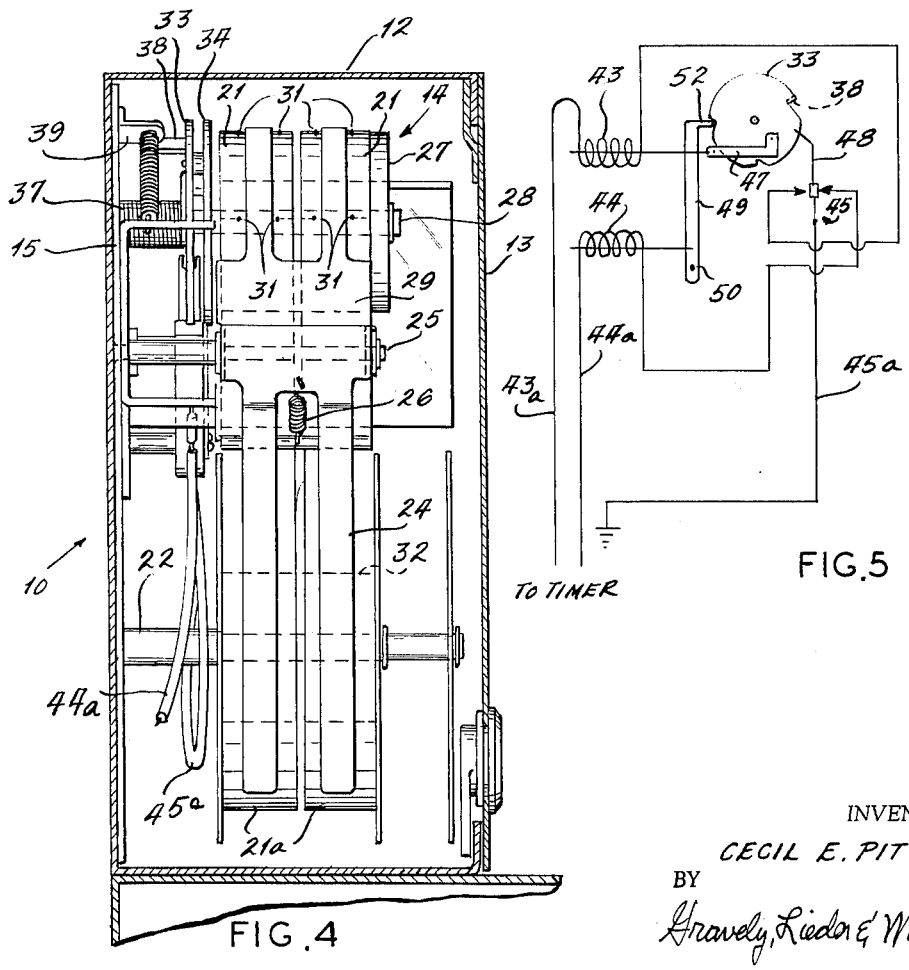
INVENTOR.
CECIL E. PITTMAN
BY
Gravely, Lieder & Woodruff July 5, 1966  C. E. PITTMAN  3,259,289
TRADING STAMP DISPENSING MACHINE
Filed Oct. 7, 1963  2 Sheets-Sheet 2

INVENTOR.
CECIL E. PITTMAN
BY
Gravely, Lieder & Woodruff

United States Patent Office 3,259,289
Patented July 5, 1966

3,259,289
TRADING STAMP DISPENSING MACHINE
Cecil E. Pittman, 1632 Ferguson, Springfield, Mo.
Filed Oct. 7, 1963, Ser. No. 314,250
7 Claims. (Cl. 226—135)

The present invention relates to a device for dispensing trading stamps, and specifically relates to apparatus for dispensing trading stamps upon receiving impulses from a coin operated laundry apparatus, or an electrically operated, timed dispenser of materials such as a metering gasoline pump.

Trading stamps are exceedingly popular with purchasers and are given in most retail establishments such as food stores, department stores, service stations and the like. However, heretofore it has not been practical to dispense trading stamps at self-service installations such as coin operated automatic launderies, unmanned vending machines, and the like.

One of the principal objects of the present invention therefore is to provide a trading stamp dispensing apparatus adapted to dispense trading stamps from a coin operated laundry, vending machine, or the like, and also adaptable to dispense trading stamps as gasoline and other liquids are metered upon delivery.

Another object of the present invention is to provide a trading stamp dispensing apparatus which is operable from the electric impulses of a coin operated laundry machine, vending machine and the like.

Another object of the present invention is to provide a simple, easily constructed, sturdy, stamp dispensing machine which can dispense one or more stamps upon receiving an electrical impulse or impulses from a coin operated machine.

Another object of the present invention is to provide a trading stamp dispensing apparatus which is operated by solenoids to dispense stamps individually upon receiving an electrical impulse and which includes lock means to limit the number of stamps passing from the dispenser with each impulse.

These and other objects and advantages will become apparent hereinafter.

The present invention comprises a trading stamp dispensing apparatus having a pair of solenoids to drive and return a stamp dispensing spool upon reception of electrical impulses.

In the drawings, wherein like numbers refer to like parts wherever they occur:

FIG. 1 is a perspective view of a laundry machine having the present invention attached thereto;

FIG. 4 is a sectional view taken along line 4—4 of FIG. 2;

FIG. 5 is a wire diagram; and

FIG. 6 is a plan view of the drive cam.

Figure 2:
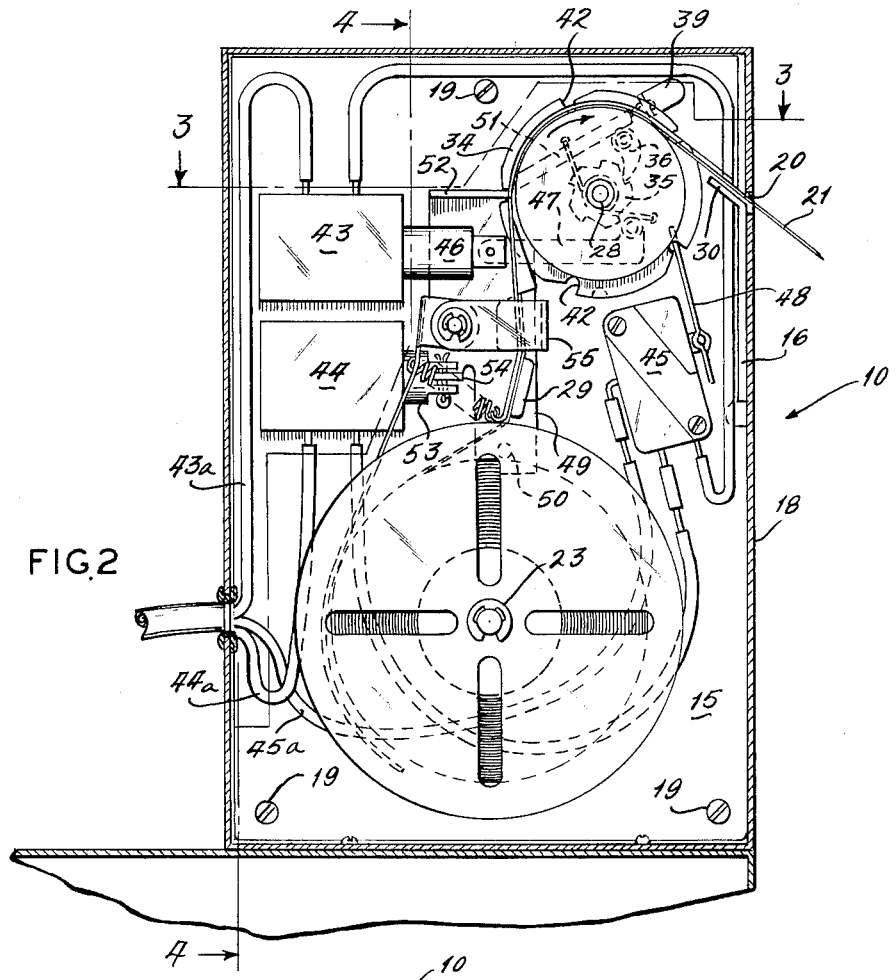
FIG. 2 is a vertical sectional view showing the housing in section and the dispensing apparatus in elevation.
Figure 3:
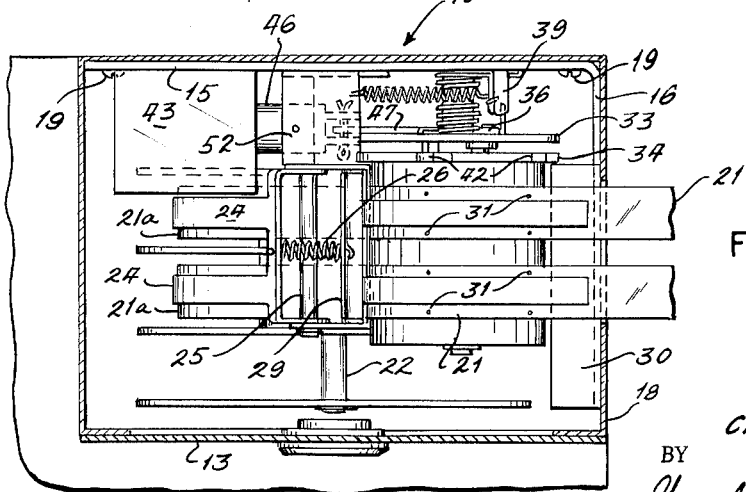
FIG. 3 is a sectional view taken along line 3—3 of FIG. 2.

FIG. 1 shows the stamp dispensing apparatus 10 mounted on a coin operated laundry machine 11. The apparatus 10 comprises a housing 12 having a removable side cover 13 and provided with a plurality of pre-positioned openings in the base for attachment to different makes of laundry machines. The dispensing mechanism 14 is mounted on a plate 15 having a right angular front wall 16 adapted to fit on the inside of the housing front wall 18 and secured therein by means of fastening means such as screws 19.

The housing front wall 18 also is provided with a longitudinal slot 20 through which the trading stamps 21 are dispensed. Cushioning means may be interposed between the plate 15 and the adjacent housing wall to cushion the operating mechanism 14 against the shocks normally occasioned in a coin operated laundry machine.

The operating apparatus includes a spool pin 22 mounted on the plate 15 and adapted to receive one or more trading stamp rolls 21a. The structure shown in the figures shows two trading stamp rolls 21a, but the pin 22 will hold more than two rolls, while under normal conditions, it is contemplated that only one roll will be mounted on the pin 22 at one time. However, if the operator wants to give two stamps 21 on a special occasion, such as a double stamp day, two stamp rolls 21a can be mounted on the pin 22, as shown. Also, at the present time, one trading stamp is given for each ten cents of merchandise or services. If this ratio were to change, additional rolls of stamps 21a can be mounted on the pin 22. A lock means 23 is positioned on the pin 22 adjacent to the outermost edge of the rolls of stamps 21a.

A stamp drag arm 24 is pivotally mounted on a pin 25 fixed to the plate 15 and is urged against the stamp roll 21a by a spring 26. The stamps 21 pass from the stamp roll 21a to a stamp dispensing spool 27 which is rotatably mounted on a spool post 28 secured to the plate 15. The stamp spool 27 also is illustrated as holding two side-by-said column stamps 21, but more can be provided, and only one normally would be used. A stamp hold-down arm 29 passes around the stamp spool 27 and is urged thereagainst by the spring 26. In cooperation with a slide 30 struck from the plate front 16, the free end of the arm defines a passage for the stamps 21 passing from the spool 27 to the dispenser housing front wall slot 20. The stamp dispensing spool 27 is provided with upstanding spaced pins 31 adapted to engage the perforations 32 between the stamps 21 to drivingly interconnect the stamps 21 and the spool 27. The stamp hold-down arm 29 positively urges the stamps 21 against the surface of the spool 27.

Also mounted on the spool post 28 are a spring loaded drive cam 33 and a lock plate 34 having a drive ratchet 35 fixed thereto. A spring loaded dog 36 is pivotally mounted on the drive cam 33 and is adapted to engage the ratchet 35 to drive the spool 27 in a clockwise direction (indicated by the arrow in FIG. 2) to dispense a single stamp 21. The dog 36 is urged in a clockwise direction toward the ratchet (as shown in FIG. 2). A return spring 37 urges the drive cam 33 in a counterclockwise direction (FIG. 2) and cooperating stop members 38 and 39, struck from the drive cam 33 and the mounting plate 15, respectively, permit limited counterclockwise rotation of the drive cam 33. The drive cam stop 38 also acts as a switch actuator as will be explained more fully hereinafter.

The outer edge of the drive cam 33 is provided with a cam surface area 40 and a lock notch 41, the purpose of which will be explained more fully hereinafter.

The lock plate 34 is provided with a series of equally spaced notches 42 about its outer periphery. The notches 42 are spaced a distance equal to the length of a stamp 21 which is being dispensed from the spool 27.

The ratchet 35 and cam dog 36 arrangement causes the spool 27 to rotate in a clockwise direction with the drive cam 33, and permits the drive cam 33 to rotate freely and independently of the spool 27 in a counterclockwise direction under the action of the return spring 37.

A pair of solenoids 43 and 44 in combination with a microswitch 45 actuate the drive cam 33 in response to electrical impulses received from an outside source, such as the timer of a conventional coin operated laundry machine, or an electrically operated vending machine, or the like. The exact construction of the timer and/or appliance to which the stamp dispenser 10 is attached, is of no critical importance to this invention and is not shown or described in detail. Any suitable apparatus for sending a pair of electrical impulses is satisfactory for use with the present invention. Such devices are commercially available and include double contact switches and the like.

A first solenoid plunger 46 is connected by an actuator arm 47 to the drive cam 33, so that when the solenoid 43 is energized, the plunger 46 moves to the left (into the solenoid 43) as shown in FIG. 2, and rotates the drive cam 33 in a clockwise direction. The stop 38 engages a contact arm 48 on the switch 45 which takes the current off of the coil of the solenoind 43 to prevent burn out of the solenoid 43, since the next impulse from the laundry machine timer may not be until six to eight minutes later. Thus in the present invention, the switch 45 is a safety device to prevent burnout of the solenoids 43 and 44. If the coils of the solenoids are of sufficient strength, the switch 45 is not necessary. As a practical matter, the switch 45 is an essential part of the mechanism.

A cam lock 49 is pivotally mounted to the plate 15 at one end 50 and is biased toward the drive cam 33 and the spool lock plate 34 by a return spring 51, mounted between the opposite end of the lock member 49 and the stop 39. An arm 52 on the cam lock 49 rides on the cam surface 40 of the drive cam 33 and engages the drive cam lock notch 41 and the spool lock notches 42. The lock arm 52 permits only one stamp 21 to be dispensed from the spool 27 and prevents continued clockwise rotation of the spool 27.

The foregoing movement of the solenoid plunger 46, the drive cam 33, the spool 27 and the cam lock 49 dispenses one stamp 21 from the spool 27, and locks the drive cam in its rotated clockwise direction.

The next impulse from the timer actuates the solenoid 44 which houses a plunger 53 attached to the cam lock 49 by means of a link 54. Inward (or leftward in FIG. 2) movement of the solenoid plunger 53 moves the cam lock 49 to the rear, away from the drive cam 33 and the spool lock plate 34 so that the drive cam 33 is free to rotate in a counterclockwise direction under the action of the return spring 37. This motion pulls the first plunger 46 out of the first solenoid 43, and in effect, cocks the device to be in condition to dispense another stamp from the spool 27 when the first solenoid 43 is energized again.

The return of the drive cam 33 allows the switch arm or stop 38 to move away from the switch lever 48 and this removes the current from the coil of the second solenoid 44 to prevent burn out of this coil. When the current is removed from the solenoid 44, the plunger 53 is free to move out of the solenoid coil, and the spring 51 urges the cam lock 49 back into engagement with the drive cam 33 and fully into the slot 42 in the spool lock 34. A cam lock stop bracket 55 struck from the plate 15 prevents excessive forward movement of the cam lock 49. The movement of the second plunger 53 is of limited scope and moves the cam lock arm 52 only far enough to free it of the drive cam lock notch 41, and not far enough to disengage the arm 52 from the lock plate notch 42. Thus the spool 27 remains locked against rotation in a clockwise or stamp dispensing direction. This prevents tampering and loss of stamps.

If the device 10 is attached to a washing machine, two stamps 21 normally are dispensed, one near the beginning of the cycle and another during the spin portion of the cycle. It is preferred that the first impulse be received at the beginning of the agitation cycle, the second impulse at the end of the agitation cycle, the third at the beginning of the spin cycle, and the fourth impulse at the end of the spin cycle. This of course can be varied to suit the individual operation and machine.

To describe in detail a complete operating cycle, the apparatus prior to energization is in the condition shown in the figures, with both of the solenoid plungers 46 and 53 in their outward position, the cam lock arm 52 engaged in a slot 42 in the spool lock plate 34, the drive cam 33 in its most counterclockwise position, and the stops 38 and 39 in engagement. Upon receiving an impulse from the laundry machine timer, the first solenoid 43 is energized and pulls the plunger 46 into the solenoid coil. The plunger 46 actuates the drive cam 33 and the dispensing spool 27 is rotated ⅕ turn in a clockwise direction through the engagement of the dog 36 and the ratchet 35 to dispense a stamp 21 (or stamps depending on the number of stamp rolls) through the slot 20. As the drive cam rotates, the stop 38 engages the switch arm 48 to divert the current from the coil of solenoid 43 to ground. Clockwise movement of the drive cam 33 raises the cam lock arm 52 from engagement in the spool slot 42 by means of the cam surface 40. Continued rotation of the drive cam 33 causes the lock arm 52 to ride on the outer edge of the drive cam 33 until the arm falls into the drive cam lock notch 41 and the next adjacent spool notch 42. This locks the drive cam 33 in its clockwise position and locks the spool 27 against further clockwise rotation.

Upon receiving the next impulse from the timer, the second solenoid 44 is energized and pulls the plunger 53 into its coil. The plunger 53 pivots the cam lock 49 toward the solenoid 44 and frees the arm 52 from the drive cam slot 41 while maintaining the arm 52 in the lock plate notch 42. The drive cam 33 is rotated by the action of the return spring 37 in a counterclockwise direction until the stops 38 and 39 are reengaged. The stop 38 releases the switch arm 48 and the current is diverted from the coil of the solenoid 44, thus releasing the solenoid plunger 53, so that the cam lock 49 is moved forward by the spring 51.

The foregoing cycle is repeated again during the laundry cycle to dispense the second stamp to which the patron is entitled.

This invention is intended to cover all changes and modifications of the examples of the invention herein chosen for purposes of the disclosure, which do not constitute departures from the spirit and scope of the invention.

What is claimed is:

1. A stamp dispenser comprising a housing having a slot in one wall thereof, a roll of stamps mounted in the housing, a dispensing spool over which the stamps pass on their path from the roll to the slot, means for positively retaining the stamps to the spool so that the spool upon rotation positively moves the stamps through the slot, means for rotating said spool through a predetermined arc, comprising a drive cam operatively connected to the spool through a dog and ratchet arrangement whereby the drive cam rotates the spool in a direction to dispense stamps through the slot and is free to return to the original position, a solenoid, and a solenoid plunger connected to the drive cam to rotate the drive cam and spool upon energization of the solenoid, means for locking said spool after its predetermined movement including a lock plate having a series of slots around its peripheral edge connected to the spool and movable therewith, a pivotally mounted lock lever biased toward the lock plate and having means for engaging the lock plate slots and the drive cam, means for retracting the lock plate during rotation of the drive cam, and means for energizing the retracting means, said means being actuated by the drive cam at the end of its stamp dispensing movement, the drive cam having spaced indentations on its preipheral surface, one of said indentations cooperating with the lock lever to lock the drive cam in its rotated position and a second of said indentations having an adjacent cam surface which moves said lock lever out of the indentations on the lock plate to permit rotative movement of the spool, and means for returning said spool rotating means to its original position while maintaining the spool in its locked condition so that the spool rotating means is in position to again rotate said spool through the predetermined arc.

2. The structure set forth in claim 1 including a second solenoid, and a solenoid plunger connected to the lock lever to retract the same and permit return of the drive cam to its original position upon energization of the second solenoid.

3. The structure set forth in claim 2 including switch means for taking current from the coils of the solenoids and passing it to ground.

4. A stamp dispenser comprising a housing having a slot in one wall thereof, a removable stamp dispensing mechanism including a removable bracket mounted in the housing, a door in one wall of the housing through which the bracket may be removed, means for mounting a stamp roll on said bracket, a stamp dispensing spool rotatably mounted on the bracket, a series of pins positioned around the spool to engage the perforations joining the stamps to positively dispense the stamps, releasable means urging the stamps against the spool, a drive cam releasably engaged with the spool, spring means urging the drive cam against a stop and urging the drive cam in a first rotary direction, a lock plate having a series of spaced perforations around its outer periphery releasably engaged with the drive cam and engaged with the spool, a first solenoid mounted on the bracket, a solenoid plunger engaged with the drive cam and adapted to rotate the drive cam a predetermined distance in a second rotary direction upon energization of the solenoid, a lock lever pivotally mounted on the bracket, means biasing the lock lever toward the spool, a lock portion adapted to ride on the outer periphery of the cam plate and lock plate and to engage the slots on the lock plate, and a second solenoid mounted on the bracket having a plunger engaged with the lock lever to disengage the lock lever from the cam plate upon energization of the second solenoid, said drive cam having a pair of indentations in the outer edge thereof, one of said indentations being a lock means engageable by the lock lever to lock the drive cam in rotated position, and the other of the indentations having an adjacent cam surface to drive the lock lever out of engagement with a slot in the lock plate upon rotation of the cam plate by the first solenoid and plunger.

5. A stamp dispenser comprising a housing having a slot in one wall thereof, and a stamp dispensing mechanism comprising means for mounting a roll of stamps, a dispensing spool over which the stamps pass on their path from the roll to the slot, means for retaining the stamps on the spool, drive means for the spool including a drive cam having spaced indentations in its outer periphery, means operatively connecting the drive cam to the dispensing spool, and means for rotating said drive cam, switch means for deenergizing the drive means, the drive cam including a switch actuating arm which engages the switch means at the end of the forward movement of the spool, a lock plate fixed to the spool, said lock plate having a series of slots in its outer surface, a pivotally mounted lock lever biased toward the lock plate and the drive cam and having means for engaging the lock plate slots and one of the drive cam indentations to lock the drive cam in its rotated position, a second of said drive cam indentations having an adjacent cam surface to move the lock lever out of the lock plate slot to permit rotative movement of the spool.

6. A stamp dispenser comprising a housing having a slot in one wall thereof, and a stamp dispensing mechanism comprising means for mounting a roll of stamps, a dispensing spool over which the stamps pass on their path from the roll to the slot, means for retaining the stamps on the spool, drive means for the spool including a drive cam having spaced indentations in its outer periphery, means operatively connecting the drive cam to the dispensing spool, and means for rotating said drive cam, a lock plate fixed to the spool, said lock plate having a series of slots in its outer surface, a pivotally mounted lock lever biased toward the lock plate and the drive cam and having means for engaging the lock plate slots and one of the drive cam indentations to lock the drive cam in its rotated position, a second of said drive cam indentations having an adjacent cam surface to move the lock lever out of the lock plate slot to permit rotative movement of the spool, the drive cam being biased toward its starting position, a first solenoid having a plunger connected to the drive cam to rotate the same toward its stamp discharge position, and a second solenoid having a plunger connected to the lock lever to retract the same and permit return of the drive cam to its original position upon energization of said second solenoid.

7. A stamp dispenser comprising a housing having a slot in one wall thereof, a mounting plate releasably mounted in the housing, and a dispensing mechanism mounted thereon and removable therewith for repair or replacement as a unit, said stamp dispensing mechanism comprising means for mounting a roll of stamps, a dispensing spool over which the stamps pass on their path from the roll to the slot, means for retaining the stamps on the spool, drive means for the spool including a drive cam having spaced indentations in its outer periphery, means operatively connecting the drive cam to the dispensing spool, and means for rotating said drive cam, a lock plate fixed to the spool, said lock plate having a series of slots in its outer surface, a pivotally mounted lock lever biased toward the lock plate and the drive cam and having means for engaging the lock plate slots and one of the drive cam indentations to lock the drive cam in its rotated position, a second of said drive cam indentations having an adjacent cam surface to move the lock lever out of the lock plate slot to permit rotative movement of the spool.

References Cited by the Examiner
UNITED STATES PATENTS

| 2,193,589 | 3/1940 | Grunwald | 226—131 X |
|---|---|---|---|
| 2,258,912 | 10/1941 | Steen et al. | |
| 2,451,467 | 10/1948 | Bickel | 226—46 |
| 2,986,354 | 5/1961 | Smith et al. | |

ROBERT B. REEVES, *Primary Examiner.*

RAPHAEL M. LUPO, *Examiner.*

A. McKEON, *Assistant Examiner.*